(12) United States Patent
Agombar et al.

(10) Patent No.: US 8,533,411 B2
(45) Date of Patent: Sep. 10, 2013

(54) MULTIPLE BACKUP PROCESSES

(75) Inventors: John P. Agombar, Hampshire (GB); Christopher B. Beeken, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 144 days.

(21) Appl. No.: 13/039,108

(22) Filed: Mar. 2, 2011

(65) Prior Publication Data
US 2011/0225380 A1    Sep. 15, 2011

(30) Foreign Application Priority Data
Mar. 11, 2010    (EP) .................................... 10156180

(51) Int. Cl.
*G06F 13/00* (2006.01)
*G06F 13/28* (2006.01)

(52) U.S. Cl.
USPC ............................ 711/162; 707/610; 707/640

(58) Field of Classification Search
USPC ........... 711/162, 161; 707/610, 640, 999.204
See application file for complete search history.

(56) References Cited

U.S. PATENT DOCUMENTS

| | | | |
|---|---|---|---|
| 7,007,143 B2 * | 2/2006 | Cochran | ...................... 711/162 |
| 7,188,272 B2 | 3/2007 | Bartfai et al. | |
| 7,191,304 B1 | 3/2007 | Cameron et al. | |
| 7,360,048 B2 | 4/2008 | Agombar et al. | |
| 7,386,695 B2 | 6/2008 | Fuente | |
| 7,509,523 B2 | 3/2009 | Agombar et al. | |
| 7,676,641 B2 | 3/2010 | Agombar et al. | |
| 7,752,457 B2 * | 7/2010 | Yagawa | ........................ 713/189 |
| 7,793,144 B2 | 9/2010 | Agombar et al. | |
| 8,051,259 B2 * | 11/2011 | Agombar et al. | ............. 711/159 |
| 8,230,185 B2 * | 7/2012 | Agombar et al. | ............. 711/162 |
| 2004/0030727 A1 | 2/2004 | Armangau et al. | |
| 2005/0021565 A1 | 1/2005 | Kapoor et al. | |
| 2005/0278391 A1 | 12/2005 | Spear et al. | |
| 2006/0112244 A1 | 5/2006 | Buah et al. | |
| 2006/0139697 A1 | 6/2006 | Fuente | |

(Continued)

FOREIGN PATENT DOCUMENTS

| | | |
|---|---|---|
| CN | 1702627 | 11/2005 |
| CN | 1794199 | 6/2006 |

(Continued)

OTHER PUBLICATIONS

"Information Materials for IDS" dated Oct. 5, 2011 from Japanese Office Action dated Sep. 20, 2011 for Application No. 2011-533674 filed Oct. 20, 2009, pp. 1-2.

(Continued)

*Primary Examiner* — Christian P Chace
*Assistant Examiner* — Stephen Hinds
(74) *Attorney, Agent, or Firm* — Janaki K. Davda; Konrad Raynes Davda & Victor LLP (57) ABSTRACT

Handling multiple backup processes comprises detecting that a defined storage volume is present in a first cascade of storage volumes, detecting that the defined storage volume is also present in a second cascade of storage volumes, receiving a data write for either the defined storage volume or the last storage volume in the first cascade of storage volumes, and performing a cleaning data write on the defined storage volume in the second cascade of storage volumes, the cleaning data write corresponding to the received data write.

15 Claims, 6 Drawing Sheets

(56) References Cited

U.S. PATENT DOCUMENTS

| | | | |
|---|---|---|---|
| 2006/0143413 | A1 | 6/2006 | Agombar et al. |
| 2006/0179061 | A1 | 8/2006 | D'Souza et al. |
| 2006/0230243 | A1 | 10/2006 | Cochran et al. |
| 2007/0016740 | A1 | 1/2007 | Somavarapu |
| 2007/0061531 | A1 | 3/2007 | Bartfai et al. |
| 2007/0294493 | A1 | 12/2007 | Buah et al. |
| 2008/0114951 | A1 | 5/2008 | Lee |
| 2008/0183973 | A1 | 7/2008 | Aguilera et al. |
| 2008/0189482 | A1 | 8/2008 | Fuente et al. |
| 2008/0215837 | A1 | 9/2008 | Agombar et al. |
| 2008/0256311 | A1 | 10/2008 | Lee |
| 2009/0307450 | A1 | 12/2009 | Lee |
| 2010/0023561 | A1 | 1/2010 | Zlotnick |
| 2010/0077160 | A1 | 3/2010 | Liu et al. |
| 2010/0088468 | A1 | 4/2010 | Agombar et al. |
| 2012/0246427 | A1 | 9/2012 | Agombar et al. |

FOREIGN PATENT DOCUMENTS

| | | |
|---|---|---|
| CN | 1828513 | 9/2006 |
| EP | 1645960 | 5/2007 |
| WO | 2010049314 | 5/2010 |
| WO | 2011036015 | 3/2011 |
| WO | 2011036020 | 3/2011 |

OTHER PUBLICATIONS

U.S. Appl. No. 13/125,276, filed Apr. 20, 2011 by inventors J.P. Agombar, et al., pp. 46.

PCT International Search Report dated Sep. 14, 2011 for Application No. PCT/EP2011/057950 filed May 17, 2011, Total pp. 12.

U.S. Appl. No. 13/039,245, filed Mar. 2, 2011 by inventors J.P. Agombar, et al., Total pp. 22.

U.S. Appl. No. 13/069,293, filed Mar. 22, 2011 by inventors J.P. Agombar, et al., Total pp. 24.

U.S. Appl. No. 13/244,094, filed Sep. 23, 2011 by inventors C.B. Beeken, et al., Total pp. 50.

U.S. Appl. No. 13/251,867, filed Oct. 3, 2011 by inventors C.B. Beeken, et al., Total pp. 32.

R. Hou, et a., "Data Replication and Recovery with Dell/EMC SnapView 2.0 and MirrorView", Dell Enterprise Systems, Feb. 2003, Total pp. 23.

W. Xiao, et al., "Case for Continuous Data Protection at Block Level in Disk Array Storages", IEEE Transactions on Parallel and Distributed Systems, vol. 20, No. 6, Jun. 2009, Total pp. 14.

English abstract of Chinese patent No. CN1794199, published Jun. 28, 2006 by S. Agombar et al.

Preliminary Amendment dated Apr. 20, 2011, pp. 1-6 for U.S. Appl. No. 13/125,276, filed May 17, 2012 by inventors J. P. Agombar, et al.

Prelim Remarks dated May 17, 2012, pp. 1-2 for U.S. Appl. No. 13/474,647, filed May 17, 2012 by inventors J.P. Agombar, et al.

Office Action dated Jan. 7, 2013, pp. 1-42, for U.S. Appl. No. 13/069,293, filed Mar. 22, 2011 by inventors J.P. Agombar, et al.

Response dated Apr. 8, 2013, pp. 1-11, for Office Action dated Jan. 7, 2013, pp. 1-42, for U.S. Appl. No. 13/069,293, filed Mar. 22, 2011 by inventors J.P. Agombar, et al.

Preliminary Remarks dated May 29, 2012, pp. 1-6, for U.S. Appl. No. 13/482,656, filed May 29, 2012 by inventors J.P. Agombar, et al.

Office Action dated Mar. 28, 2013, pp. 1-30, for U.S. Appl. No. 13/482,656, filed May 29, 2012 by inventors J.P. Agombar, et al.

Chinese Office Action dated Nov. 29, 2012 for Serial No. 200980140528.6.

"Information Materials for IDS" dated Dec. 6, 2012 for Chinese Office Action dated Nov. 29, 2012.

English translation of CN1702627 Nov. 30, 2005.

English Translation of CN1828513 Sep. 6, 2006.

Preliminary Amendment dated May 17, 2012, pp. 1-6 for U.S. Appl. No. 13/125,276, filed May 17, 2012 by inventors J. P. Agombar, et al.

U.S. Appl. No. 13/474,647, filed May 17, 2012 by inventors J.P. Agombar, et al.

* cited by examiner

MULTIPLE BACKUP PROCESSES

CROSS-REFERENCE TO RELATED FOREIGN APPLICATION

This application is a non-provisional application that claims priority benefits under Title 35, Unites States Code, Section 119(a)-(d) from European Patent Application entitled "MULTIPLE BACKUP PROCESSES" by John P. Agombar and Christopher B. Beeken, having European Patent Application No. EP10156180.1, filed on Mar. 11, 2010, which application is incorporated herein by reference in its entirety.

BACKGROUND

This invention relates to a method of, and system for, handling multiple backup processes.

The storage of data in large organisations is of fundamental importance, both for reliability of the data and for the ability to recover data in the event of any hardware failure. Storage area network (SAN) is an architecture that is used when very large amounts of data are needed to be stored in a reliable and secure manner. This technology allows networks to be created that support the attachment of remote computer storage devices such as disk arrays to servers in such a way that, to the operating system, the devices appear as locally attached. It is common in these networks to include a large amount of redundancy, both in the data storage and in the hardware connections between the individual components.

Various methods exist for creating data redundancy. For example, a function such as a FlashCopy® function enables an administrator to make point-in-time, full volume copies of data, with the copies immediately available for read or write access. (FlashCopy is a registered trademark of International Business Machines Corporation in the United States and other countries.) The FlashCopy® can be used with standard backup tools that are available in the environment to create backup copies on tape. A FlashCopy® function creates a copy of a source volume on a target volume. This copy, as mentioned above, is called a point-in-time copy. When a Flash-Copy® operation is initiated, a relationship is created between a source volume and target volume. This relationship is a "mapping" of the source volume and the target volume. This mapping allows a point-in-time copy of that source volume to be copied to the associated target volume. The relationship exists between this volume pair from the time that the FlashCopy® operation is initiated until the storage unit copies all data from the source volume to the target volume, or the relationship is deleted.

When the data is physically copied, a background process copies tracks from the source volume to the target volume. The amount of time that it takes to complete the background copy depends on various criteria, such as the amount of data being copied, the number of background copy processes that are running and any other activities that are presently occurring. The FlashCopy® function works in that the data which is being copied does not actually need to be copied instantaneously, it only needs to be copied just prior to an update causing an overwrite of any old data on the source volume. So, as data changes on the source volume, the original data is copied to the target volume before being overwritten on the source volume.

Therefore, a FlashCopy® is a feature supported on various storage devices that allows a user or an automated process to make nearly instantaneous copies of entire logical volumes of data. A copy of a source disk is made on a target disk. The copies are immediately available for both read and write access. A common feature of FlashCopy® like implementations is the ability to reverse the copy. That is, to populate the source disk of a FlashCopy® map with the contents of the target disk. It is also possible to use FlashCopy® in cascaded implementations, in which a target disk later becomes the source disk for a further FlashCopy® or vice versa.

A cascaded configuration of storage volumes is described in detail in U.S. Pat. No. 7,386,695. It is also possible to create multiple cascades of storage volumes which are interlocking at a logical level. A first cascade may comprise storage volumes A, B, C and D which are arranged in a cascade as follows: A↔B↔C↔D, while at a later time a new backup of A may be started that ultimately leads to the creation of A↔E↔F. Many different combinations of FlashCopy® functions and reversed functions are possible, potentially creating complicated multiple cascading storage volumes.

In order to keep track of such cascaded storage volumes and FlashCopy® functions it is preferable to provide a data structure that defines primary and secondary "fdisks". An fdisk is a logical component that includes an index defining the storage volume to which the fdisk relates and providing links to the relevant maps that define the up and down directions of the FlashCopy® functions in a cascade. When a FlashCopy® function is created between a source volume and a target volume, then primary fdisks are created for each storage volume, unless a primary fdisk already exists for the target disk, in which case that existing fdisk for the target volume is converted to a secondary fdisk and a new primary fdisk is created. The advantage of using a data structure as defined by the fdisks is that the fdisks can be used to keep track of the IO read and write accesses to different storage volumes within existing multiple cascades and direct data reads to the correct location within the cascade.

The use of the concept of fdisks allows a storage volume to appear in different FlashCopy® cascades concurrently. The more times that a disk appears in a cascade the more IO operations may be required at the FlashCopy® level (cleaning IOs) before a host originated IO can be completed back to the host. For this reason the number of fdisks for each disk is typically limited (for example to 2). This will, in turn, limit the number of active FlashCopy® backup or restore operations that can be started in a cascade, whilst any existing maps are still active. One way around this problem is to collapse cascades containing fdisks from the same disk back into a single cascade. There are however problems with reforming a single cascade which normally require unpleasant restrictions. Two examples are given below.

In a first example, suppose there are disks A, B, C, D, E and F. There are created FlashCopy® maps A→B, A→C, A→D, A→E and A→F. If the system started the maps A→D, A→C and A→B in order then there will be the cascade A→B→C→D. After A→D completes, there will result a cascade A→B→C. If it is now discovered that disk A is corrupt and the administrator wishes to restore from disk A from disk D, then there is created and started a map D→A, which results in cascades D→A and A→B→C. Before Flash-Copy® D→A is completed, the administrator wishes to continue making backups of disk A. So there are started maps A→F and A→E, before D→A is completed. This ends up with cascades D→A→E→F and A→B→C.

In this scenario, the administrator is now stuck with two fdisks for A, until either A→B and A→C stop or complete, or D→A stops or D→A and A→E complete. If disk A was to again become corrupted, the administrator would be unable to restore disk A again until one of these were to happen. Now if there is a restriction that it is only possible to write to the original source disk A then when D→A completes it is possible to naturally return the cascade configuration to A→E→F→B→C, because the cleaning required for writes to A mean that B is independent of any grains changed since D→A was started. However, this read-only target restriction means that the user cannot create FlashCopy® maps for development or test purposes, which maps that require their target to be writable. Thus the scenario has a restriction that is not overcome by any prior art solutions.

In a second example, suppose there are disks A, B, C, D, E and F. There is created FlashCopy® maps A→B, B→C, B→D, B→E and B→F. Suppose further that A→B is incremental and disks C, D, E and F are Space Efficient vdisks. The user starts maps A→B and then B→C giving a cascade A→B→C. When A→B completes a split stop will leave cascade B→C. Disk C is independent of disk A, so if disk A fails, then disk C is still available to the user. Now if the user starts A→B again, which completes quickly because it is incremental, it is also possible to start B→D. This gives cascades A→B→D and B→C. When A→B completes the user again split stops it and (to minimize the number of fdisks and allow the user again to restart A→B) the user wants to end up with cascade B→D→C. This will work fine provided only disk A and/or disk B is written to by the host. As with the previous example, this means that the user cannot create FlashCopy® maps for development or test purposes, maps that require its target to be writable. Thus the scenario has a restriction that is not overcome by any prior art solutions.

BRIEF SUMMARY

It is therefore an object of the invention to improve upon the known art.

According to a first aspect of the present invention, there is provided a method of handling multiple backup processes comprising detecting that a defined storage volume is present in a first cascade of storage volumes, detecting that the defined storage volume is also present in a second cascade of storage volumes, receiving a data write for either the defined storage volume or the last storage volume in the first cascade of storage volumes, and performing a cleaning data write on the defined storage volume in the second cascade of storage volumes, the cleaning data write corresponding to the received data write.

According to a second aspect of the present invention, there is provided a system for handling multiple backup processes comprising a plurality of storage volumes and a storage volume controller connected to the storage volumes, the storage controller arranged to detect that a defined storage volume is present in a first cascade of storage volumes, detect that the defined storage volume is also present in a second cascade of storage volumes, receive a data write for either the defined storage volume or the last storage volume in the first cascade of storage volumes, and perform a cleaning data write on the defined storage volume in the second cascade of storage volumes, the cleaning data write corresponding to the received data write.

According to a third aspect of the present invention, there is provided a computer program product on a computer readable medium for handling multiple backup processes, the product comprising instructions for detecting that a defined storage volume is present in a first cascade of storage volumes, detecting that the defined storage volume is also present in a second cascade of storage volumes, receiving a data write for either the defined storage volume or the last storage volume in the first cascade of storage volumes, and performing a cleaning data write on the defined storage volume in the second cascade of storage volumes, the cleaning data write corresponding to the received data write.

Owing to the invention, it is possible to provide a method and system that introduces the concept of a cascade cleaning mechanism to remove the restrictions of the prior art systems. An extra cleaning write is used to ensure that a cascade downstream of a given primary fdisk can be fitted into another cascade downstream of the corresponding secondary fdisk. This method and system of the invention improves the above cited disadvantages of the prior art by removing the restrictions identified earlier. By performing the extra cleaning write it is possible to extend existing systems and allow the user to make the their FlashCopy® targets writable yet are still able to combine cascades back into a single cascade to allow further backups or restore operations to proceed whilst the existing maps are active.

BRIEF DESCRIPTION OF THE SEVERAL VIEWS OF THE DRAWINGS

Embodiments of the present invention will now be described, by way of example only, with reference to the accompanying drawings, in which:—

DETAILED DESCRIPTION

Figure 1:
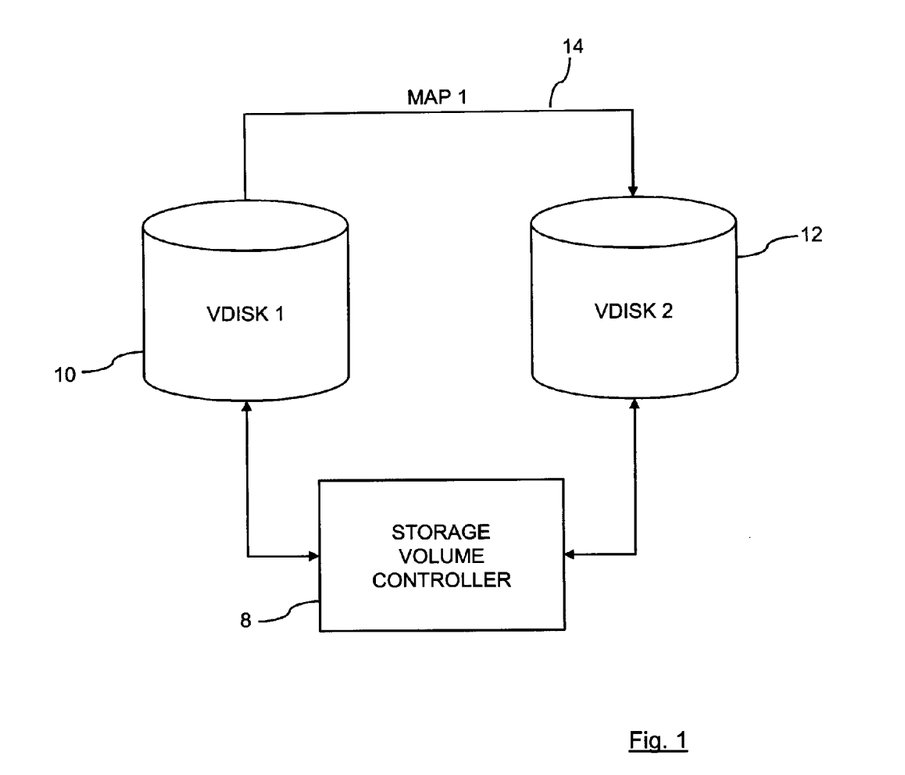
FIG. 1 is a schematic diagram of a pair of storage disks.

FIG. 1 illustrates the concept of a FlashCopy® using a storage controller 8 and two storage disks 10 and 12. The disks 10 and 12 could form part of a larger array of disks, and would typically form part of an enterprise storage solution. The disks 10 and 12 could be part of a storage solution relating to a commercial website, for example. If at any time a backup needs to be made of the content of vdisk1, then a FlashCopy® instruction can be sent from the storage volume controller 8 to that disk 10, which defines a source disk 10 (vdisk1) and also a target disk 12 (vdisk2), which is the target of the FlashCopy®. The FlashCopy® instruction creates a point-in-time copy of the image of the disk which is the source disk 10.

In the example of FIG. 1, the source disk 10 of a first FlashCopy® instruction is vdisk1, and the target disk 12 is vdisk2. The FlashCopy® instruction starts the FlashCopy® process, which creates a map 14 from the source disk 10 to the target disk 12. This map is labelled map 1 in the Figure. The image of vdisk1 at this specific point in time is now available on vdisk2. This creates a backup of the data on vdisk1, and also allows tests and other administration tasks to be run on the data of vdisk1, without the attendant danger of losing any of the original data, as it is preserved on the original source disk 10.

When a FlashCopy® is made, it creates a link between the two disks 10 and 12, as defined by the map 14. Data may now be copied across in the background, with the additional requirement that any access to vdisk2 (as the target disk 12) will immediately cause the relevant parts of the image of vdisk1 to be copied across, and also any access to vdisk1 which would result in a change to the image stored by that disk 10 will also cause the unaltered data to be immediately copied across to the target disk 12. In this way, the vdisk2, to an outside user, stores the point in time copy of vdisk1, although data will only be physically copied across under the circumstances described above.

Figure 2:
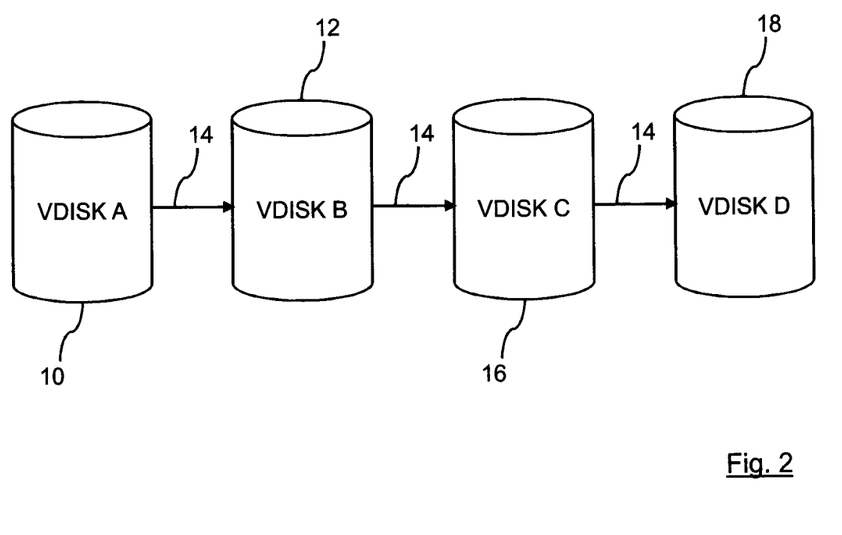
FIG. 2 is a schematic diagram of a FlashCopy® cascade.

A storage volume that is the target volume of a FlashCopy® function can also be the source volume of a further FlashCopy® function, thus creating a cascade of storage volumes. FIG. 2 shows an example of a cascade of storage volumes 10, 12, 16 and 18, which are linked by respective maps 14, which each define a FlashCopy® function from a source volume to a target volume. Disk B is providing a backup of disk A, disk C is providing a backup of disk B and disk D is providing a backup of disk C. The FlashCopy® functions linking the different storage volumes would have been started at different times, which create different point-in-time copies of the images stored by the respective storage volumes.

In the FlashCopy® cascade of A↔B↔C↔D, where A, B, C and D are the disks in the cascade, shown in FIG. 2, and the arrows are the FlashCopy® maps, then denoting (A, B) to be a FlashCopy® mapping from disk A to disk B, the cascade has maps (A, B), (B, C) and (C, D). In this implementation of the cascade, a new data write to disk A can cause a split write to disk B, as per the respective FlashCopy® function, which is required to maintain the image on disk B. This writing to disk B this will cause further clean reads of disks B and C and clean writes to disk D followed by a write to disk C. In this way a single write to the first storage volume 10 in the cascade can result in a large number of clean operations.

More complex cascades are possible, particularly when a storage volume is used as the source of more than one FlashCopy® function. For example, a user may wish to carry out two different tests on a current image stored by disk A. The user may initiate FlashCopy® maps A→B and A→E, for example, so that they can perform the individual tests on the disks B and E. If the user then prefers the latter of these two test results, they may initiate the FlashCopy® map E→A to transfer that data back to disk A. Similarly, FlashCopy® reversals that are performed to restore data to an original disk will result in a complicated arrangement of the disks and FlashCopy® maps.

Figure 3:
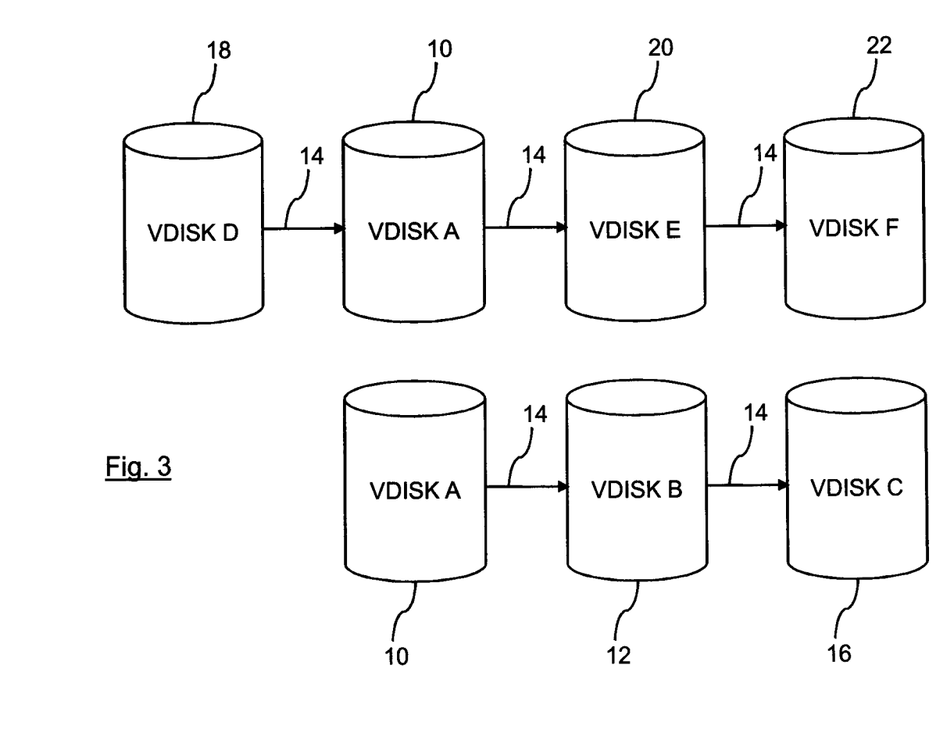
FIG. 3 is a schematic diagram of a different FlashCopy® cascade.

FIG. 3 illustrates the first example discussed above, which uses disks A, B, C, D, E and F. There are created FlashCopy® maps A→B, A→C, A→D, A→E and A→F. If the system started the maps A→D, A→C and A→B in order then there will be the cascade A→B→C→D. After A→D completes, there will result a cascade A→B→C. If it is now discovered that disk A is corrupt and the administrator wishes to restore disk A from disk D, then there is created and started a map D→A, which results in cascades D→A and A→B→C. Before FlashCopy® D→A is completed, the administrator wishes to continue making backups of disk A. So there are started maps A→F and A→E, before D→A is completed. This ends up with cascades D→A→E→F and A→B→C, as shown in FIG. 3.

In prior art systems, the administrator is now stuck with two fdisks for A, until either A→B and A→C stop or complete, or D→A stops or D→A and A→E complete. If disk A was to again become corrupted, the administrator would be unable to restore disk A again until one of these were to happen. Now if there is a restriction that it is only possible to write to the original source disk A then when D→A completes it is possible to naturally return the cascade configuration to A→E→F→B→C, because the cleaning required for writes to A mean that B is independent of any grains changed since D→A was started. However, this read-only target restriction means that the user cannot create FlashCopy® maps for development or test purposes, which maps that require their target to be writable.

In this example, after the restore and subsequent backups of disks A there are the cascades D→A→F and A→B→C. The storage controller 8 is operated to clean the data on the secondary copy of disk A for any write to disk F, where disk F is the disk furthest downstream of a primary that has a secondary in another cascade. If another copy of A is taken, which introduces disk E into the cascade, then the cascades are D→A→E→F and A→B→C. Then the storage controller 8 will still clean the data on the secondary copy of disk A for any write to primary A or disk F. There is no need to clean secondary A for writes to disk E because these writes will naturally split the data from disk A onto disk F. Once D->A completes, the controller 8 can now combine the two cascades to form A→E→F→B→C, because the writes to disk F have caused splits to B, just as if the cascade had originally been constructed in that way. There is no real overhead to this solution since the extra clean for a write to disk F is just like a split read and write that would occur if the disk was not at the end of a cascade.

Figure 4A:
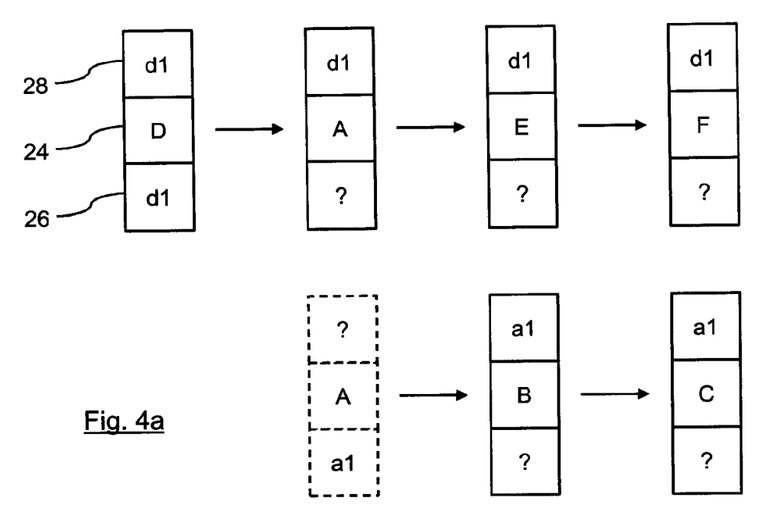
FIGS. 4 and 5 are schematic diagrams illustrating data writes.

FIG. 4 illustrates the handling of a new write to disk A in the system configuration of FIG. 3. FIG. 4 is showing the concept of the handling of the write with respect to a single grain of data within the different storage volumes. FIG. 4a shows the cascade prior to any write taking place. Each grain of data is represented by three blocks, the middle block 24 being a storage volume identifier 24. The lower block 26 represents the actual data being stored by the specific grain of data in the volume and the upper block 28 represents the location of data to be presented in the event of a read of the specific grain of data.

In the top row of FIG. 4a, the grains of data on storage volumes A, E and F have a "?" with respect to the specific grain of data. This means that the data d1 from storage volume D has not yet been copied across to the backup disks. Since the FlashCopy® function is a copy-on-write function, when, for example, disk E is read, no data is copied to disk E. The host read of disk E will be redirected to grain d1 on storage volume D, to find the data to be read, according to the upper block 28.

The bottom row of FIG. 4a represents the cascade A→B→C, where A is a secondary fdisk (indicated by the dotted line). This is a data structure separate from the actual storage volume A that needs to be maintained to serve accesses to storage volumes B and C. Note that the upper box 28 of the secondary representation of disk A has a "?", this is because the data returned for this grain does not logically exist because it is not the primary image. Any data read of disk A is handled with respect to the primary representation of the data, which is in the first cascade (top row) of FIG. 4a.

Figure 4B:
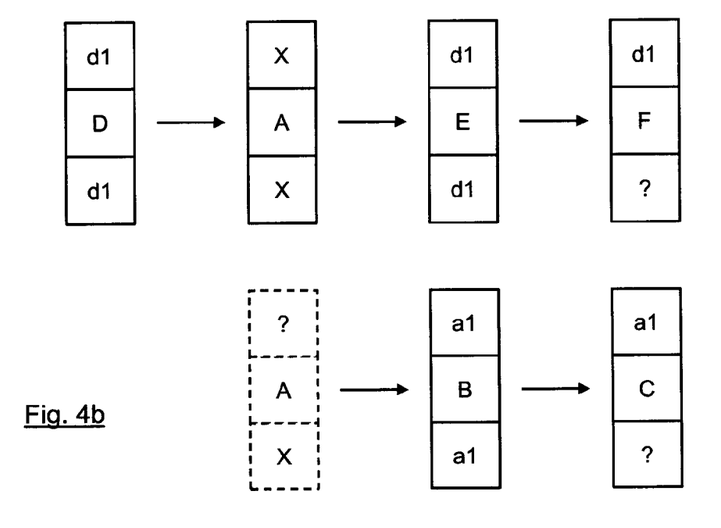

FIG. 4b shows the configuration of FIG. 4a after a data write of X has been made to the specific grain of data of disk A. This data write results in the new data "X" appearing on disk A, and any read of A will be directed to "X". Since disks B and E are previous point-in-time copies of the image stored by A, they must copy across the relevant data, before the new data "X" is written to the grain of disk A. On disk E, the data for the grain is "d1" and under the copy-on-write FlashCopy® function, this data must now be copied to disk E. Likewise disk B now copies across "a1" to the relevant grain.

Figure 5:
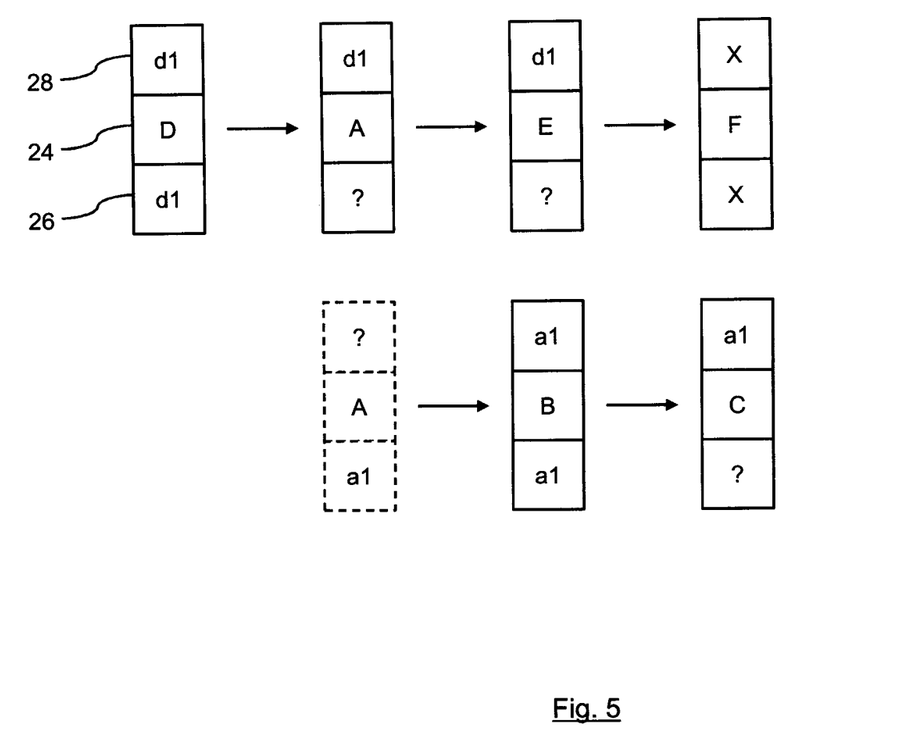

FIG. 5 shows the same configuration of storage volumes as in FIG. 3 and FIG. 4a, after a data write has been made to disk F. Data "X" has been written to the grain under consideration, but this time to disk F rather than disk A. As can be seen in the cascade forming the top row of this Figure, the storage volume F now has data "X" in the actual data box 26 for the specific storage volume. The read direction component 28 of the grain for volume F is also changed to "X" to reflect that any future data reads to the storage volume F will be read from the grain of the storage volume rather than redirected to any other location.

In addition to the write of the data to volume F, there is performed a cleaning data write on the storage volume A in the second cascade of storage volumes, which cleaning data write corresponds to the received data write of disk F, in grain terms. So from the secondary of volume A in the lower cascade, the grain "a1" is copied across to storage volume B. This action is not needed under any FlashCopy® process that exists in either cascade; it is an extension of the backup processes to prepare for the merging of the cascades into a single cascade in the future. The data write onto the storage volume at the bottom of the cascade containing the primary representation of disk A results in the copy across from the secondary representation of disk A in the second cascade.

Figure 6:
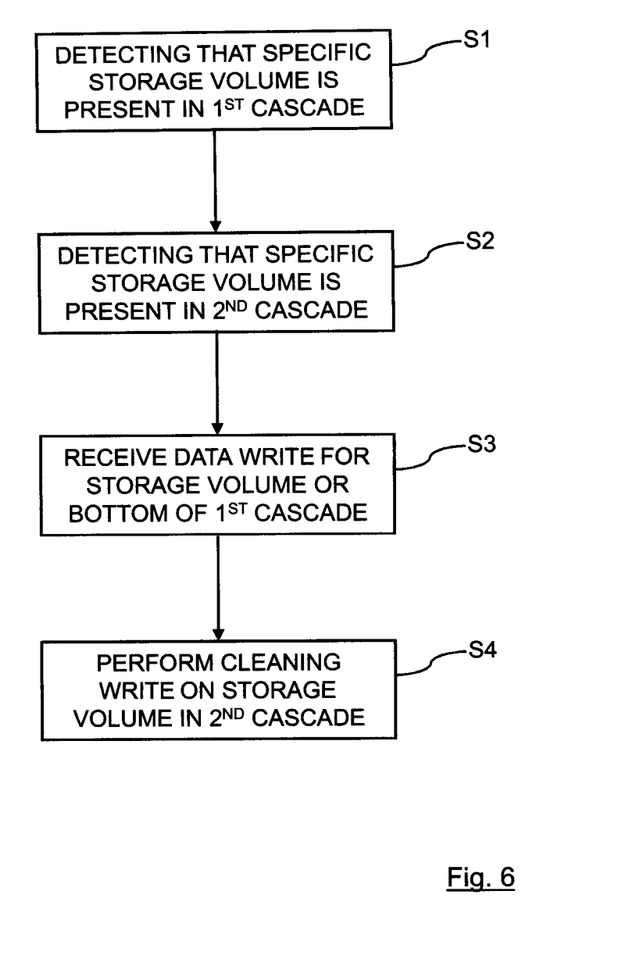
FIG. 6 is a flowchart of a method of handling backup processes.

FIG. 6 shows a flowchart summarising the operation of the storage volume controller 8. The method of handling multiple backup processes, which is performed by the controller 8 comprises, at step S1, the step of detecting that a defined storage volume is present in a first cascade of storage volumes. As discussed above, a cascade of storage volume comprises a plurality of storage volumes connected by a plurality of FlashCopy® functions, each FlashCopy® function creating a map from a source volume to a target volume. The cascade of storage disks can be user created or may have been created in response to one or more automated administrative functions of the storage system.

The second step of the method is step S2 which comprises detecting that the defined storage volume is also present in a second cascade of storage volumes. The defined storage volume is represented by a primary fdisk in the first cascade of storage volumes and represented by a secondary fdisk in the second cascade of storage volumes. The controller 8 has access to the various data structures and metadata that exists in relation to the storage by the different storage volumes and is able to track the presence of a storage volume in multiple cascades. The fdisks can preferably used for this purpose, as the existence of a primary and secondary fdisk for a storage volume indicates that the specific storage disk is present in two different cascades.

The third step in the method is the step S3 of receiving a data write for either the defined storage volume or the last storage volume in the first cascade of storage volumes, and this is followed by the step S4 of performing a cleaning data write on the defined storage volume in the second cascade of storage volumes, the cleaning data write corresponding to the received data write. As discussed above, the normal working of the FlashCopy® function in a multiple cascade scenario is extended to provide the cleaning of data in the second cascade, in order to better prepare for future handling of the multiple cascades. The method of operation by the controller 8 can be further extended by detecting that a specific FlashCopy® function has completed and combining the first cascade of storage volumes and the second cascade of storage volumes into a single cascade of storage volumes in response.

The invention claimed is:

1. A method of handling multiple backup processes, comprising:
   detecting, using a storage controller, that a defined storage volume is present in a first cascade of storage volumes;
   detecting that the defined storage volume is present in a second cascade of storage volumes;
   receiving a data write for a last storage volume in the first cascade of storage volumes; and
   performing a cleaning data write on the defined storage volume in the second cascade of storage volumes by copying data from the defined storage volume in the second cascade of storage volumes to another storage volume in the second cascade of storage volumes, wherein the cleaning data write corresponds to the received data write.

2. The method according to claim 1, wherein the first cascade of storage volumes comprises a plurality of storage volumes connected by a plurality of copy functions, wherein each of the copy functions creates a map from a source volume to a target volume.

3. The method according to claim 2, and further comprising:
   detecting that a specific copy function has completed; and
   combining the first cascade of storage volumes and the second cascade of storage volumes into a single cascade of storage volumes.

4. The method according to claim 1, wherein the defined storage volume is represented by a primary fdisk in the first cascade of storage volumes and represented by a secondary fdisk in the second cascade of storage volumes.

5. The method according to claim 1, further comprising:
   receiving a data write for the defined storage volume in the first cascade of storage volumes; and
   performing the cleaning data write on the defined storage volume in the second cascade of storage volumes, wherein the cleaning data write corresponds to the received data write.

6. A system for handling multiple backup processes comprising a plurality of storage volumes and a storage volume controller connected to the storage volumes, the storage controller arranged to:
   detect that a defined storage volume is present in a first cascade of storage volumes,
   detect that the defined storage volume is present in a second cascade of storage volumes,
   receive a data write for one of the defined storage volume and a last storage volume in the first cascade of storage volumes, and
   perform a cleaning data write on the defined storage volume in the second cascade of storage volumes by copying data from the defined storage volume in the second cascade of storage volumes to another storage volume in the second cascade of storage volumes, wherein the cleaning data write corresponds to the received data write.

7. The system according to claim 6, wherein the first cascade of storage volumes comprises a plurality of storage volumes connected by a plurality of copy functions, wherein each of the copy functions creates a map from a source volume to a target volume.

8. The system according to claim 7, wherein the storage controller is further arranged to detect that a specific copy function has completed and combine the first cascade of storage volumes and the second cascade of storage volumes into a single cascade of storage volumes.

9. The system according to claim 6, wherein the defined storage volume is represented by a primary fdisk in the first cascade of storage volumes and represented by a secondary fdisk in the second cascade of storage volumes.

10. The system according to claim 6, wherein the storage controller is further arranged to receive a data write for the defined storage volume in the first cascade of storage volumes and perform the cleaning data write on the defined storage volume in the second cascade of storage volumes, wherein the cleaning data write corresponds to the received data write.

11. A computer program product on a non-transitory computer readable storage for handling multiple backup processes, the product comprising instructions, which, when executed by a storage controller, perform:
   detecting that a defined storage volume is present in a first cascade of storage volumes, detecting that the defined storage volume is present in a second cascade of storage volumes,
   receiving a data write for a last storage volume in the first cascade of storage volumes, and
   performing a cleaning data write on the defined storage volume in the second cascade of storage volumes by copying data from the defined storage volume in the second cascade of storage volumes to another storage volume in the second cascade of storage volumes, wherein the cleaning data write corresponds to the received data write.

12. The computer program product according to claim 11, wherein the first cascade of storage volumes comprises a plurality of storage volumes connected by a plurality of copy functions, wherein each of the copy functions creates a map from a source volume to a target volume.

13. The computer program product according to claim 12, and further comprising instructions for:
   detecting that a specific copy function has completed; and
   combining the first cascade of storage volumes and the second cascade of storage volumes into a single cascade of storage volumes.

14. The computer program product according to claim 11, wherein the defined storage volume is represented by a primary fdisk in the first cascade of storage volumes and represented by a secondary fdisk in the second cascade of storage volumes.

15. The computer program product according to claim 11, and further comprising instructions for:
   receiving a data write for the defined storage volume in the first cascade of storage volumes; and
   performing the cleaning data write on the defined storage volume in the second cascade of storage volumes, wherein the cleaning data write corresponds to the received data write.

\* \* \* \* \*